(No Model.)
L. S. CRITTENDEN.
FARM WAGON.
No. 443,902. Patented Dec. 30, 1890.
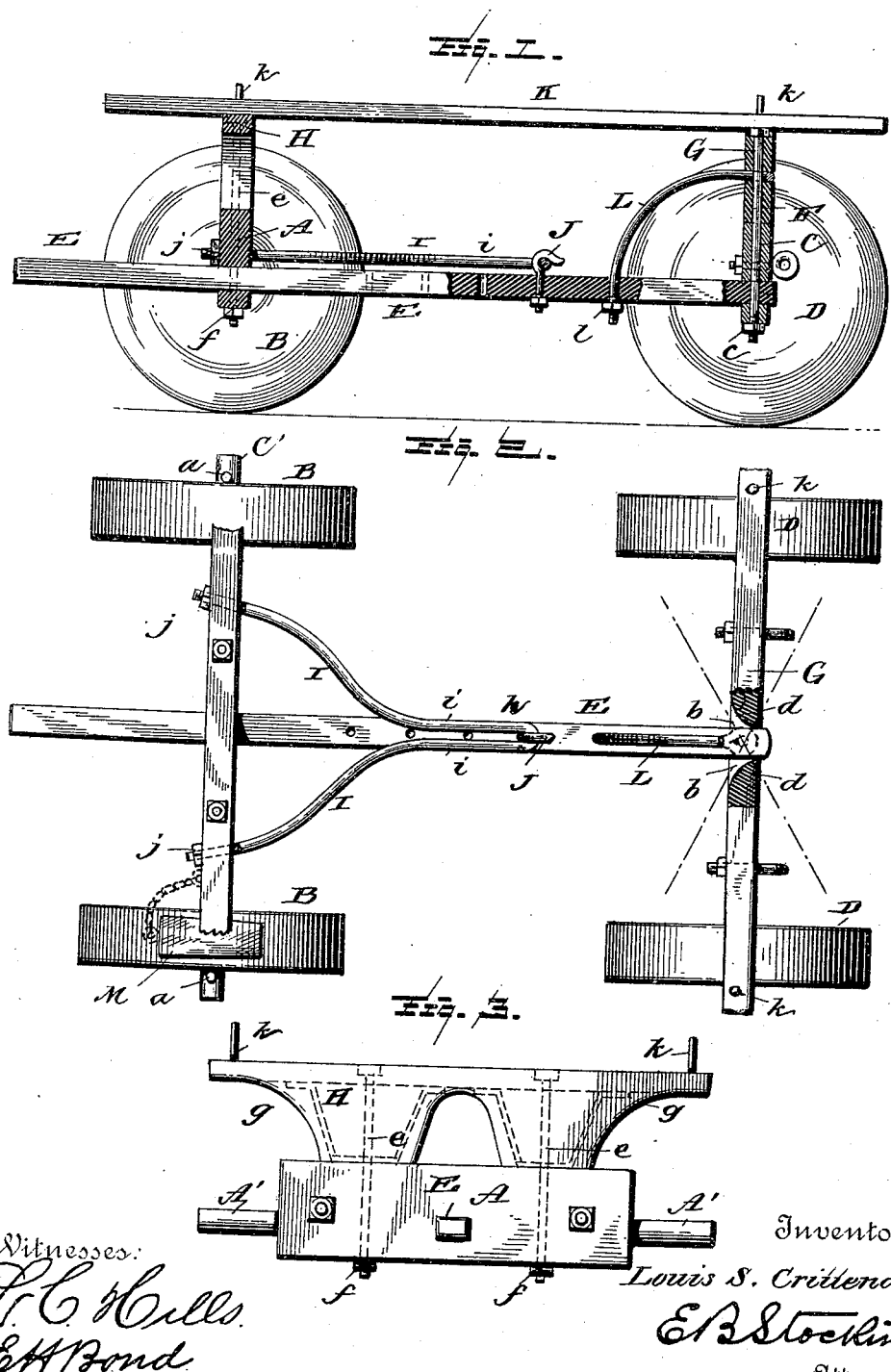
Witnesses:
L. C. Hills
E. H. Bond
Inventor:
Louis S. Crittenden
E. B. Stocking
Attorney

UNITED STATES PATENT OFFICE.

LOUIS S. CRITTENDEN, OF CANASERAGA, NEW YORK.

FARM-WAGON.

SPECIFICATION forming part of Letters Patent No. 443,902, dated December 30, 1890.

Application filed September 22, 1890. Serial No. 365,741. (No model.)

*To all whom it may concern:*

Be it known that I, LOUIS S. CRITTENDEN, a citizen of the United States, residing at Canaseraga, in the county of Allegany, State of New York, have invented certain new and useful Improvements in Farm-Wagons, of which the following is a specification, reference being had therein to the accompanying drawings.

This invention relates to certain new and useful improvements in farm wagons or trucks; and it has for its object, among others, to provide a simple, cheap, and strong farm-wagon which may be turned within small compass, adapted for use upon wet and marshy ground without the wheels sinking into the ground to any appreciable extent.

Other objects and advantages of the invention will hereinafter appear, and the novel features will be particularly pointed out in the appended claims.

The invention is clearly illustrated in the accompanying drawings, and with the letters of reference marked thereon form a part of this specification, and in which—

Figure 1 is a longitudinal vertical section through a wagon embodying my improvement, with portions broken away. Fig. 2 is a top plan with the platform removed. Fig. 3 is a rear view with the wheels and platform removed.

Like letters of reference indicate like parts throughout the several views.

Referring now to the details of the drawings by letter, A designates the rear axle, which consists of a rectangular-shaped block provided at its ends with stub-shafts A' to receive the wheels B, which are retained thereon in any suitable manner—as, for instance, by the keys $a$, as seen best in Fig. 2.

C is the front axle, similar to the rear axle, being provided with stub-shafts C', upon which the wheels D are held by suitable means, as the keys $a$.

E is the reach, the rear end of which is passed through an opening formed centrally in the rear axle, and its forward end is seated in a recess $b$ in the front axle, and is pivoted therein by means of the king-bolt F, which passes vertically through the front bolster G, through the front axle, and through a hole in the front end of the reach, its head being seated in a recess in the bolster and its lower end screw-threaded and provided with a nut $c$ upon the under side of the axle, as seen in Fig. 1. The chamber $b$ in the front axle has beveled side walls $d$, as seen in Fig. 2, to permit play of the parts, the inclined walls serving as stops to limit the movement of the parts.

H is the rear bolster, secured to the rear axle by means of vertical bolts $e$, provided with nuts $f$, and their head seated in recesses in the bolster, as seen in Fig. 3. Both the front and rear bolsters have their ends concaved, as shown at $g$ and extended over the wheels, as seen.

I are the hounds, formed of a single piece of material, provided at the center with a loop $h$ and parallel arms $i$, extending therefrom, the said parallel arms diverging and extended through the rear axle in an inclined direction, as seen in Fig. 2, being provided upon their rear ends with nuts $j$. This forms a light strong brace. The loop $h$ is designed to engage a hook or eyebolt J, which is adjustable on the reach, as seen in Figs. 1 and 2, so as to lengthen or shorten the same, as occasion may require.

K is the platform supported upon the front and rear bolsters and removably confined between the stakes or uprights $k$.

L is a curved brace, having one end passed through a hole in the reach and upon the under side thereof provided with a nut $l$, the other end being formed with an eye, which embraces the king-bolt F, within an aperture in the front bolster substantially midway of the height thereof, as seen best in Fig. 1. The wheels have a broad tread, as seen in Fig. 2, so as to adapt them for use upon soft ground without cutting in. They may be made solid, as shown in Fig. 1, if desired.

Instead of forming the bolsters as shown by full lines in Fig. 3, they may be made of less height, and supported upon the axle by means of a substantially U-shaped metallic support or supports, as indicated by dotted lines in Fig. 3.

In Fig. 2 I have shown a wedge M, held to some part of the wagon by a cord or chain, as indicated in said figure, and designed to be forced in from the rear between the periphery of the wheel and the rear bolster, as seen in Fig. 2, to serve as a chuck to prevent turning of the wheel and cause it to skid in going down hill.

What I claim as new is—

1. The combination, with the front and rear axles and reach, of the hound formed with a loop $h$, arms $i$, and rearwardly-extending diverging portions passed through the rear axle in an inclined direction and provided with nuts upon the ends thereof, and the hook J on the reach and embracing the end of the loop $h$, substantially as and for the purpose specified.

2. The combination, with the front and rear axles and the reach seated at its forward end in a recess $b$, with inclined walls $d$ in the front axle, of the front bolster, the king-bolt passed vertically through the bolster, axle, and reach, and the curved brace having one end secured to the reach and the other end formed with an eye embracing the king-bolt and seated in a recess in the front bolster, substantially as shown and described.

In testimony whereof I affix my signature in presence of two witnesses.

LOUIS S. CRITTENDEN.

Witnesses:
LEONARD SCOTT,
LEWIS H. CLARK.